(12) United States Patent
Ye

(10) Patent No.: US 9,131,516 B2
(45) Date of Patent: Sep. 8, 2015

(54) METHOD OF PREVENTING RANDOM ACCESS RESPONSE COLLISION

(71) Applicant: ACER INCORPORATED, New Taipei (TW)

(72) Inventor: Shiang-Rung Ye, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 101 days.

(21) Appl. No.: 13/798,212

(22) Filed: Mar. 13, 2013

(65) Prior Publication Data

US 2013/0258961 A1 Oct. 3, 2013

Related U.S. Application Data

(60) Provisional application No. 61/617,681, filed on Mar. 30, 2012, provisional application No. 61/644,454, filed on May 9, 2012.

(51) Int. Cl.
*H04W 4/00* (2009.01)
*H04W 74/08* (2009.01)
*H04W 74/04* (2009.01)

(52) U.S. Cl.
CPC ............ *H04W 74/085* (2013.01); *H04W 74/04* (2013.01)

(58) Field of Classification Search
CPC ............... H04W 72/1289; H04W 74/0833; H04W 48/00; H04W 24/02; H04W 52/242; H04W 52/325; H04W 72/0413; H04W 72/0426; H04W 52/50; H04W 52/281; H04W 72/0446; H04L 1/00

USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529

See application file for complete search history.

(56) References Cited

U.S. PATENT DOCUMENTS 7,388,879 B2 6/2008 Sabe
7,848,346 B2 12/2010 Park (Continued)

FOREIGN PATENT DOCUMENTS

CN 101472345 A 7/2009
CN 101616443 A 12/2009

(Continued)

OTHER PUBLICATIONS

New Postcom, Timing reference cell selection for TA group, 3GPP TSG RAN WG2 Meeting #76, R2-115739, Nov. 14-18, 2011, pp. 1-4, XP050564275, San Francisco, USA.

(Continued)

*Primary Examiner* — Jung-Jen Liu
(74) *Attorney, Agent, or Firm* — Winston Hsu; Scott Margo

(57) ABSTRACT

A method of preventing random access response collision for a network in a wireless communication system is disclosed. The method comprises assigning a first preamble for a non contention random access procedure on a secondary cell configured to a first mobile device of the wireless communication system, to the first mobile device, and configuring a first preamble transmission time for indicating at least a subframe for the first mobile device to transmit the first preamble on the secondary cell to the network, to the first mobile device.

4 Claims, 3 Drawing Sheets

(56) References Cited

U.S. PATENT DOCUMENTS

| | | | |
|---|---|---|---|
| 8,204,041 | B2 | 6/2012 | Britsch |
| 8,527,892 | B2 | 9/2013 | Sirpal |
| 8,601,052 | B2 | 12/2013 | Mir |
| 8,811,961 | B2 | 8/2014 | Lee |
| 8,908,560 | B2 | 12/2014 | Maeda |
| 2008/0181127 | A1 | 7/2008 | Terry |
| 2008/0273610 | A1 | 11/2008 | Malladi |
| 2010/0184458 | A1 | 7/2010 | Fodor |
| 2010/0240372 | A1* | 9/2010 | Wu .................... 455/436 |
| 2011/0177816 | A1 | 7/2011 | Hole |
| 2011/0194478 | A1 | 8/2011 | Lee |
| 2011/0199910 | A1 | 8/2011 | Oh |
| 2011/0274040 | A1* | 11/2011 | Pani et al. .............. 370/328 |
| 2012/0014371 | A1 | 1/2012 | Weng |
| 2012/0257513 | A1 | 10/2012 | Yamada |
| 2013/0021993 | A1 | 1/2013 | Chou |
| 2013/0114398 | A1 | 5/2013 | Wang |
| 2013/0114577 | A1 | 5/2013 | Cai |
| 2013/0188582 | A1* | 7/2013 | Dinan .................. 370/329 |
| 2013/0242851 | A1* | 9/2013 | Dinan .................. 370/312 |
| 2013/0301591 | A1* | 11/2013 | Meyer et al. ............ 370/329 |
| 2014/0133337 | A1* | 5/2014 | Lee et al. ............... 370/252 |

FOREIGN PATENT DOCUMENTS

| | | |
|---|---|---|
| CN | 101682888 A | 3/2010 |
| CN | 102123425 A | 7/2011 |
| CN | 102271318 A | 12/2011 |
| EP | 1 915 010 A2 | 4/2008 |
| EP | 2 343 947 A1 | 7/2011 |
| TW | 201210237 | 3/2012 |
| WO | 2011063244 A2 | 5/2011 |
| WO | 2012154955 A1 | 11/2012 |
| WO | 2013051865 A2 | 4/2013 |
| WO | 2013119160 A1 | 8/2013 |

OTHER PUBLICATIONS

Renesas Mobile Europe, Multiple timing advance using multiple RACH, 3GPP TSG-RAN WG2 Meeting #74, R2-113014, May 9-13, 2011, XP050495152, Barcelona, Spain, pp. 1-3.

Catt, Timing Reference Change, 3GPP TAG RAN WG2 Meeting #77, R2-120252, Feb. 6-10, 2012, pp. 1-2, XP050565341, Dresden, Germany.

Huawei, Different Timing Advance Impact on Carrier Aggregation, 3GPP TSG RAN WG2 Meeting #67bis, R2-095815, Oct. 12-Oct. 16, 2009, pp. 1-3, XP050390299, Miyazaki, Japan.

Nokia Siemens Networks et al, Various correction to MAC, 3GPP TSG-RAN WG2 Meeting #66, R2-093447, May 5-8, 2009, XP050340531, San Francisco, USA.

Interdigital Communications, Support for RACH on SCells in LTE CA, 3GPP TSG-RAN WG2 #74, Tdoc R2-113258, May 9-13, 2011, pp. 1-3, XP050495410, Barcelona, Spain.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.4.0 (Dec. 2011), p. 33, 34, 39.

Wang, "Methods and System for Reference Cell Maintenance", U.S. Appl. No. 61/556,298, filed Nov. 7, 2011, and claimed by US Publication No. 2013/0114398.

Alcatel-Lucent, "Multiple Timing Advances for Carrier Aggregation", 3GPP TSG-RAN WG4 Meeting #60bis, R4-115111, Zhuhai, China, Oct. 10-14, 2011, pp. 1-4.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 3GPP TS 36.300 V10.3.0 (Mar. 2011), Apr. 5, 2011, Coverpage and p. 2, 72, 73.

Acer Incorporated, "Changing of DL Timing Reference", 3GPP TSG-RAN WG2 #77, R2-120229, Dresden, Germany, Feb. 6-10, 2012, p. 1.

* cited by examiner

METHOD OF PREVENTING RANDOM ACCESS RESPONSE COLLISION

CROSS REFERENCE TO RELATED APPLICATIONS

This application claims the benefit of U.S. Provisional Application No. 61/617,681, filed on Mar. 30, 2012 and entitled "Prevent collision of RAR", and No. 61/644,454, filed on May 9, 2012 and entitled "Timing Reference Reporting", the contents of which are incorporated herein in their entirety.

BACKGROUND OF THE INVENTION

1. Field of the Invention

The application relates to a method utilized in a wireless communication system, and more particularly, to a method of preventing random access response collision in a wireless communication system.

2. Description of the Prior Art

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting. In carrier aggregation, the UE only has one RRC connection with the network. At RRC connection establishment/re-establishment/handover, one serving cell provides the NAS mobility information, and the security input. This cell is referred to as a primary cell (PCell). In the downlink, the component carrier corresponding to the PCell is the Downlink Primary Component Carrier (DL PCC) while in the uplink it is the Uplink Primary Component Carrier (UL PCC). In addition, cells other than the PCell are named secondary cell (SCell).

According to the specification of the LTE-Advanced system, a UE performs a random access procedure for synchronizing with a serving base station on uplink timing, to prevent, signals transmitted from the UE from colliding with those sent from other UEs under the coverage of the base station. For a non contention random access procedure, the network assigns a dedicated preamble to the UE for triggering the non contention random access procedure, and thereby the UE transmits the dedicated preamble to the network. After the network receives the dedicated preamble from the UE, the network transmits a random access response (RAR) including timing advance command for uplink synchronization to the UE. Note that, according to the agreement on LTE-Advance system specification, the UE may transmit the preamble on a SCell, but receives the RAR from the network on a PCell. In addition, the UE shall receive the RAR during a RAR window. If the UE does not receive the RAR during the RAR window, the random access procedure is considered failure. Moreover, the network uses a medium access control protocol data unit (MAC PDU) to transmit the RAR to the UE. The UE decodes the MAC PDU by a random access radio network temporary identifier (RA-RNTI) which is calculated by the UE and network according to a subframe where the preamble is transmitted.

However, the applicant notices problems associated to RAR collision. In detail, if two UEs transmit the same dedicated preambles respectively to the network for the non contention random access procedure at the same time, the two UEs derive the same RA-RNTI. As abovementioned, the RAR is transmitted only on a PCell. If the two UEs have the same PCell, both UEs decode the RAR at the PCell, and thereby causing RAR collision. One UE may not successfully perform uplink synchronization since timing advance command of the RAR is accurate only for one of the UEs.

Take an example based on the abovementioned concept. A UE1 is assigned with a dedicated preamble for transmission on a SCell A. In addition, a UE2 is assigned with the same dedicated preamble on a PCell A or a SCell B, where a PCell of the UE1 and the PCell A of UE2 are the same cell. The UE1 transmits the dedicated preamble to the network on the SCell A and meanwhile the UE2 transmits the dedicated preamble to the network on the PCell A or the SCell B. In this situation, the UE1 and UE2 derive the same RA-RNTI and thereby both decode the RAR transmitted by the network on the PCell A, which causes a RAR collision. Since the UE1 and UE2 do not know the RAR is for itself or not, the UE1 and UE2 may both apply the timing advance command and/or the uplink grant in the RAR. This may cause data transmission failed on one of the UE1 and UE2 or only one UE can be uplink synchronized with the network since the timing advance command and/or the uplink grant is accurate only for the UE1 or UE2.

SUMMARY OF THE INVENTION

The application discloses a method of preventing random access response collision in a wireless communication system, in order to solve the abovementioned problems.

A method of preventing random access response collision for a network in a wireless communication system is disclosed. The method comprises assigning a first preamble for a non contention random access procedure on a secondary cell configured to a first mobile device of the wireless communication system, to the first mobile device, and configuring a first preamble transmission time for indicating at least a subframe for the first mobile device to transmit the first preamble on the secondary cell to the network, to the first mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
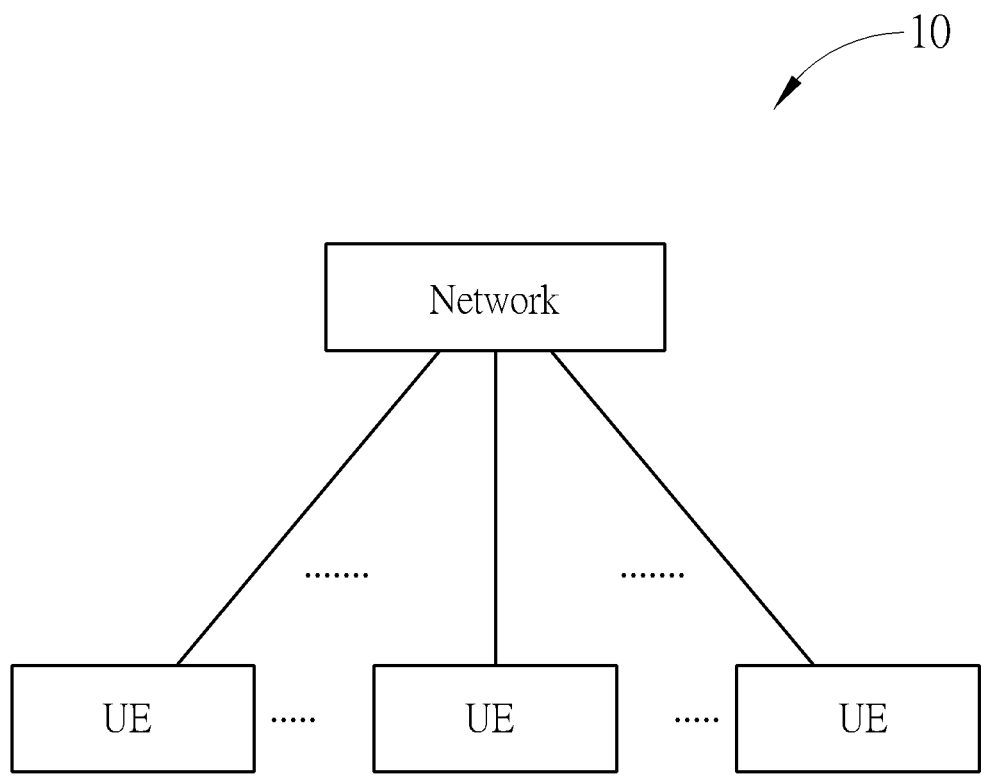
FIG. 1 illustrates a schematic diagram of an exemplary wireless communication system.

Please refer to FIG. 1, which is a schematic diagram of a wireless communication system 10. The wireless communication system 10 is a Long-Term Evolution advanced (LTE-A) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
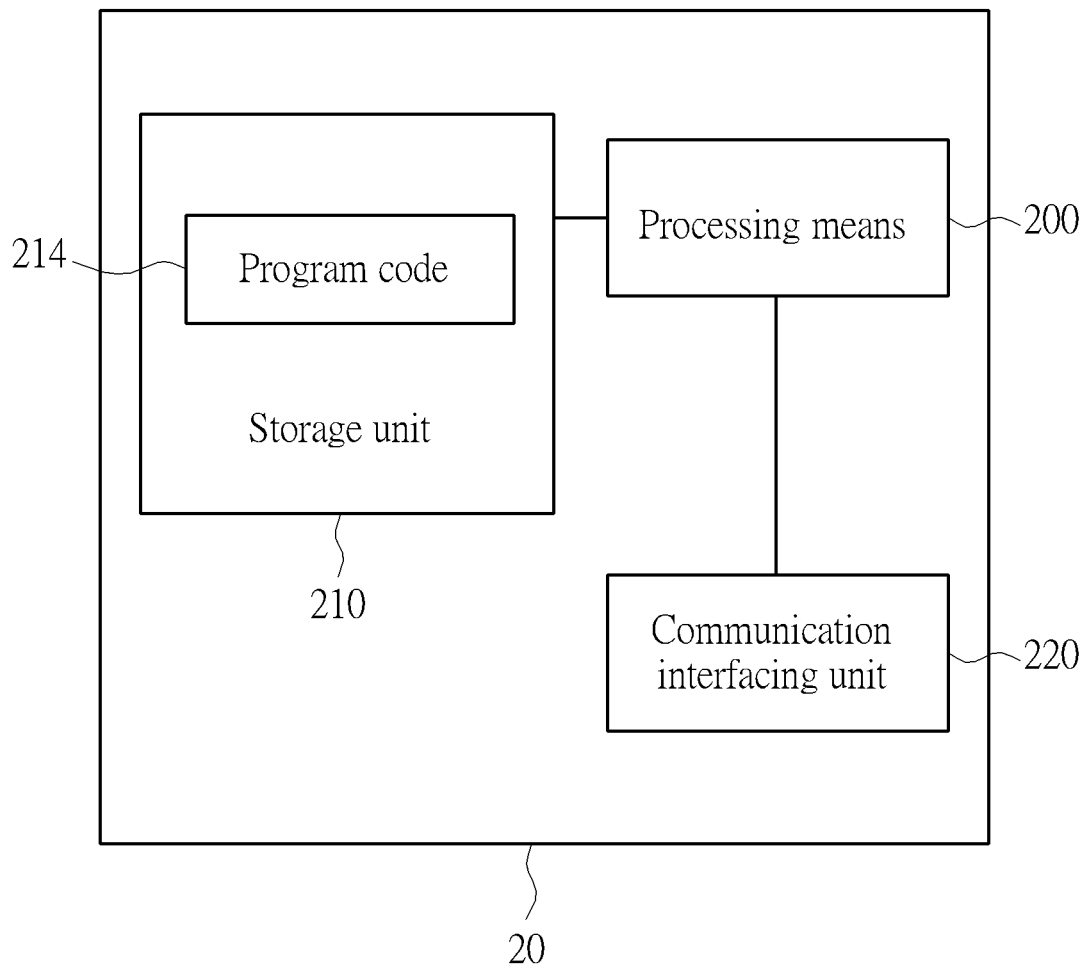
FIG. 2 illustrates a schematic diagram of an exemplary communication device.

FIG. 2 illustrates a schematic diagram of an exemplary communication device 20. The communication device 20 can be the UE or the network shown in FIG. 1. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
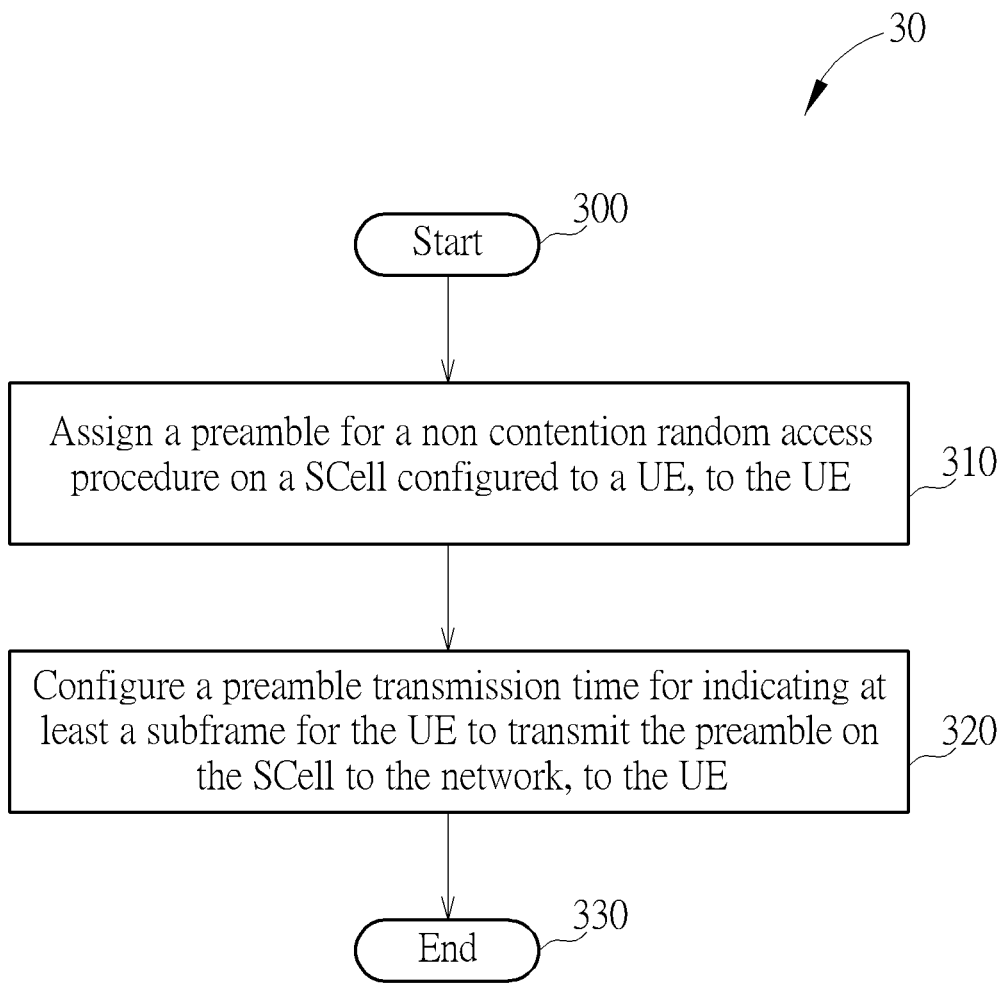
FIG. 3 is a flowchart of an exemplary process.

Please refer to FIG. 3, which illustrates a flowchart of an exemplary process 30. The process 30 is utilized in a network (i.e. an eNB) as shown in FIG. 1, for preventing random access response (RAR) collision. The process 30 can be compiled into the program code 214 and includes the following steps:

Step 300: Start.
Step 310: Assign a preamble for a non contention random access procedure on a SCell configured to a UE, to the UE.
Step 320: Configure a preamble transmission time for indicating at least a subframe for the UE to transmit the preamble on the SCell to the network, to the UE.
Step 330: End.

According to the process 30, the network indicates the dedicated preamble transmission time to the UE, and thereby the UE transmits the assigned dedicated preamble to the network only on the subframes indicated by the network. Note that, the assigned preamble is a dedicated preamble for both of the primary cell and the secondary cell configured to the UE. As a result, a RAR collision may be avoided if the UE follows the preamble transmission time configured by the network.

Take an example based on the process 30. The network assigns a first dedicated preamble for the non contention random access procedure to a UE1 and a second dedicated preamble to a UE2, wherein the UE1 and the UE2 have the same primary cell, and the first dedicated preamble and the second dedicated preamble are the same. The network further configures a first preamble transmission time to the UE1 and a second preamble transmission time to the UE2, wherein the first preamble transmission time is different to the second preamble transmission time. Thus, the UE1 and UE2 do not transmit the dedicated preambles at the same time. In this situation, the UE1 and UE2 do not derive the same random access radio network temporary identifier (RA-RNTI), and thereby do not decode a RAR on the primary cell at the same time. In a word, with dedicated preamble transmission time separation, the RAR collision can be avoided. Thus, the UEs do not apply inaccurate resource (i.e. timing advance command and/or uplink grant), which may cause uplink timing synchronization failure or transmission failure. The detailed description of problems associated to the RAR collision can be referred from above, so it is omitted herein.

To realize configuration of the preamble transmission time, the network may use a parameter (i.e. a PRACH Mask Index) for indicating which subframes the UE can transmit a preamble.

In addition, according to the current specification of the LTE-Advanced system, the network configures a set of preambles for the contention random access procedure and a set of preambles for the non contention random access procedure, to a cell. In order to prevent RAR collision, in an embodiment, the network may configure all cells belonged to an operator or in a radio access technology (RAT) with the same set of preambles for the contention random access procedure and the same set of preambles for the non contention random access procedure. In this situation, a preamble belonged to a set of preambles for the contention random access procedure does not belong to a set of preambles for the non contention random access procedure for each of the cells. In other words, a UE uses a preamble for the non contention random access procedure, does not use it for the contention random access procedure. Thus, it is impossible that two UEs use the same preamble for performing the contention random access procedure and the non contention random access procedure on the same cell. Therefore, the RAR collision is avoided with the same preamble configuration on all cells.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention provides methods for the network to prevent RAR collision, so as to avoid resource waste.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of preventing random access response collision for a network in a wireless communication system, the method comprising:
   assigning a first preamble for a non contention random access procedure on a secondary cell configured to a first mobile device of the wireless communication system, to the first mobile device;
   configuring a first preamble transmission time for indicating at least a subframe for the first mobile device to transmit the first preamble on the secondary cell to the network, to the first mobile device; and
   configuring the same set of preambles for a contention random access procedure to cells including a primary cell configured to the first mobile device and the secondary cell, whereby a preamble belonged to a set of preambles for the contention random access procedure does not belong to a set of preambles for a non contention random access procedure for each of the cells.

2. The method of claim 1,
wherein configuring the first preamble transmission time for indicating the at least a subframe for the first mobile device to transmit the first preamble on the secondary cell to the network, to the first mobile device comprises:
configuring the preamble transmission time to the first mobile device with a PRACH Mask Index, which is used for indicating which subframes the first mobile device can transmit a random access preamble to the network.

3. The method of claim 1, further comprising:
assigning a second preamble for a non contention random access procedure to a second mobile device of the wireless communication system, wherein the second preamble is the same with the first preamble, and the second mobile device and the first mobile device have the same primary cell; and
configuring a second preamble transmission time for indicating at least a subframe for the second mobile device to transmit the second preamble to the network, to the second mobile device, wherein the second preamble transmission time is different to the first preamble transmission time.

4. The method of claim 1,
wherein the first preamble is for the non contention random access procedure on a primary cell configured to the first mobile device.

* * * * *